Figure 1:
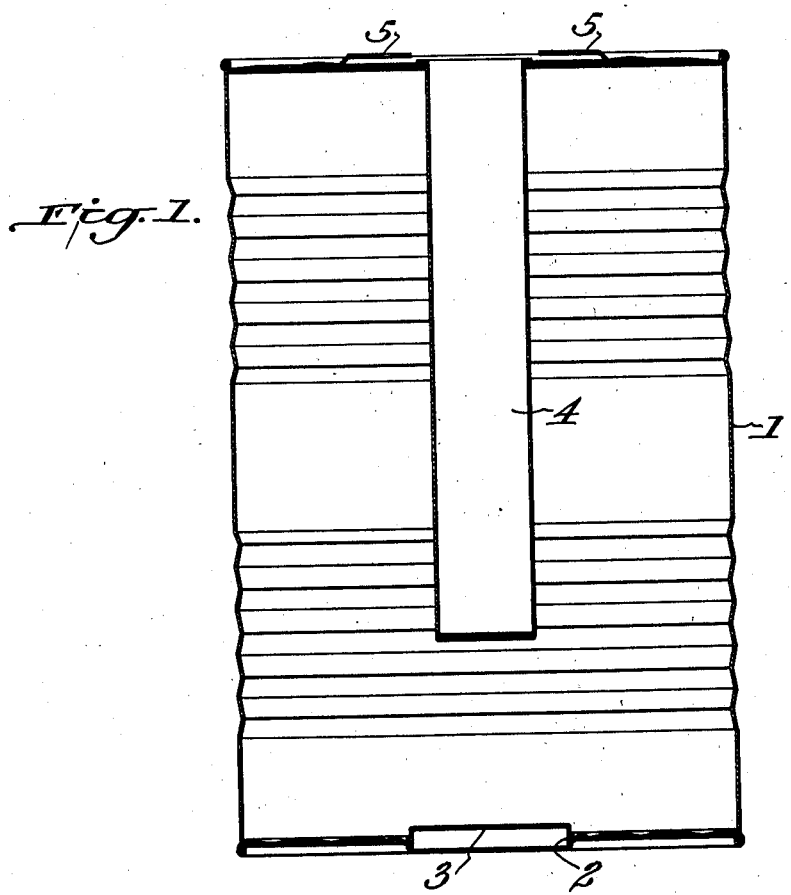

July 28, 1931.  H. T. BARNES  1,816,511
METHOD OF TREATING ICE
Filed July 24, 1928

Inventor:
Howard T. Barnes,
By Byrnes Townsend & Brickenstein,
Attorney

Patented July 28, 1931

1,816,511

UNITED STATES PATENT OFFICE

HOWARD TURNER BARNES, OF MONTREAL, QUEBEC, CANADA, ASSIGNOR TO UNION CARBIDE COMPANY, A CORPORATION OF VIRGINIA

METHOD OF TREATING ICE

Application filed July 24, 1928. Serial No. 295,042.

This invention relates to a method of and means for treating or combating ice, and is of particular applicability to ice accumulations in the nature of surface ice, ice or slush jams, frazil, anchor ice, and the like, and is also applicable to the treatment of solid ice masses such as icebergs.

Many examples of the injurious effects of ice accumulations may be given. Such accumulations frequently occur in lakes, rivers, and streams, as well as in the canals or inlets for waterpower and hydroelectric installations, of which they prevent the proper operation, reducing the supply of water thereto, and causing injury to or preventing the proper operation of the machinery, and so forth. These accumulations not only interefere with navigation, but by obstructing the flow of water in the rivers or streams, cause floods and property damage. A recent extreme instance of this sort was the ice jam which occurred in the Allegheny River in western Pennsylvania during the months of February and March 1926, causing floods which threatened the cities of Oil City and Franklin. Another recent instance was the flood which threatened the city of Belleville, Ontario in the winter of 1927–1928.

The present invention has for its object the treatment or combating of ice accumulations, including those which threaten to cause floods, those which interfere with navigation, and those which obstruct the operation of commercial enterprises, as by interfering with waterpower and hydroelectric installations.

I have found that ice accumulations of which the foregoing are examples may be effectively combated and relieved by the wide-spread application thereto and dissemination therethrough of heat by means of gases at temperatures above the freezing point of water.

Ice forms in water when the temperature is reduced by a minute fraction of a degree below the freezing point. When this ice, in the form of frazil, slush, or anchor ice, and so forth, has been formed, it quickly agglomerates into compact masses. These persist until mild weather sets in or artificial heat can be applied. By raising the temperature to the freezing point, or slightly above, the agglomerated ice masses are loosened or dislodged. The present invention relates to the application of gases above the freezing point of water to the masses to be combatted in order to raise the temperature and produce this effect. It also relates to suitable methods of applying gases to ice in an economical manner and so that they are quickly and widely distributed throughout an ice mass to be combatted.

According to the present invention the gas may be applied to the ice mass to be treated in several ways. According to a preferred method, acetylene gas is employed, and is applied to the ice by sudden generation of acetylene from calcium carbide. I have found that the most effective method is one in which calcium carbide is widely distributed or disseminated throughout the ice mass to be treated, preferably in the form of relatively small particles, or calcium carbide dust, this dissemination being suitably produced by the explosion of a calcium carbide "cartridge". The result is a rapid local evolution from each calcium carbide particle of acetylene gas at a temperature above the freezing point of water. This gas acts upon the bonds between the myriad ice crystals to produce a loosening effect thereof. As stated above, a relatively slight elevation of temperature is sufficient to destroy the bonds between these crystals, but it is desirable that the heat be locally applied and very widely distributed. The efficiency of such an application of heat is found to be high.

Figure 2:
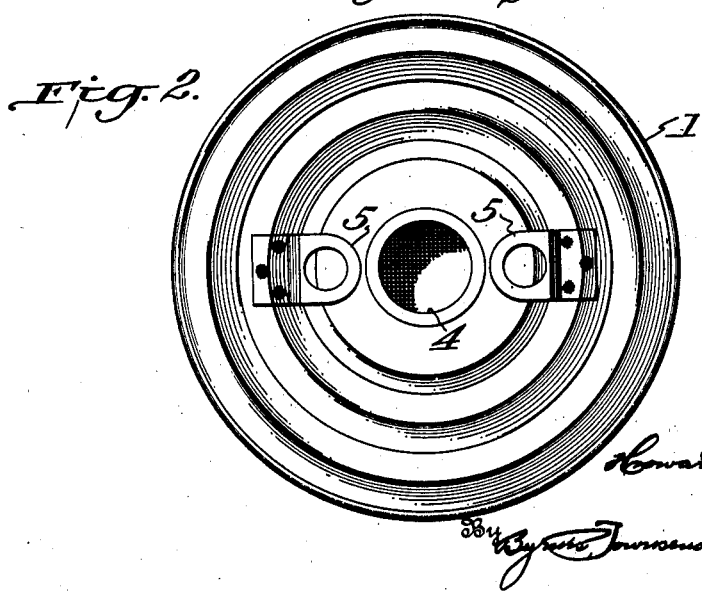

In the accompanying drawings, in which Figure 1 represents a vertical sectional view and Figure 2 represents a top plan view, I have illustrated one form of container which I have found to be particularly adapted for the application of calcium carbide to ice masses, according to the present invention.

Referring to these drawings, a sheet metal drum 1, similar to the usual carbide drum, and having circumferential stiffening corrugations, if desired, is provided with an opening 2 at one end thereof through which it may be filled with calcium carbide, preferably in finely divided form, or dust. This opening is closed by the cover 3, which may be soldered or welded in place after the drum has been charged. At the opposite end of the drum is located a hollow tube 4, extending inwardly into the drum and closed at its lower end. This reentrant tube is adapted for the reception of a small stick of dynamite or other explosive to be used in exploding the drum and distributing the calcium carbide charge contained therein. The drum is also preferably provided with straps or rings 5 through which a rope may be passed. The drum may thus be lowered through a hole in the ice to be treated, and the rope serves not only to support the drum but to hold the dynamite or other explosive in place.

The method of operation in the treatment of ice is as follows: A hole is prepared in the surface ice, as by chopping and drilling, or by the application of a material adapted to melt the ice, for example calcium chloride, which has a pronounced drilling or boring effect. The drum charged with calcium carbide, and having a dynamite stick or other explosive inserted in the internal chamber 4, thus constituting a "cartridge" for the treatment of ice, is then lowered through the surface ice into the slush ice or water below, and the explosive is set off. The result is that the container is blown to pieces, and its charge of calcium carbide is very widely distributed throughout the ice mass. Each particle of carbide immediately becomes a generator of warm acetylene gas, and this gas acts on the ice bonds between the myriads of ice crystals to produce a loosening or rotting effect on the entire mass.

My experiments have shown that calcium carbide dust is more efficient for the purpose of ice destruction than are the coarser grades of carbide. In some cases the carbide dust is apparently as much as 50% more efficient for this purpose than other grades.

The effect of calcium carbide, especially when widely distributed application thereof is made, as by exploding the container, has been found to be remarkable, particularly in the case of underhanging slush and frazil dams. The reaction continues for several minutes with great destructive effect, due to the accumulation of hot gases which detach the underhanging slush ice from the surface to which it has frozen, permitting it to be washed away. The hot gases seem to work equally well upstream against the current and downstream with the current, so that the method is equally applicable to rivers or running water and to lakes or still bodies of water. In many cases the gas accumulates in pockets under the surface ice and gradually melts its way through. In one particular instance, I treated an ice accumulation consisting of a 2 ft. layer of surface ice underlain by a 4 ft. layer of slush ice. A 50-pound charge of calcium carbide, applied as above, completely cleaned out and removed all slush ice for a radius of 50 ft. (over 31,000 cu. ft. of slush ice) around the hole through which the carbide was applied. The temperature of the air at this time was 10° F. The surface ice was washed as clean as possible by the running water, and no slush ice could be found, whereas formerly the slush ice had been thick and compactly pressed against the under side of the surface ice.

Many other modifications may be resorted to without departing from the spirit of the invention.

The present invention extends to many modifications and variations of the herein-described method and means for the treatment of ice.

I claim:

1. Method of combating ice which comprises placing therein a container charged with calcium carbide, and widely disseminating and distributing said calcium carbide charge throughout the ice to be combated by exploding said container by means of a separate explosive agent placed therein.

2. Method of treating soft or slush ice accumulations below a sheet of surface ice which comprises making a hole through the surface ice into the soft ice, placing a charge of calcium carbide in said hole, and applying said calcium carbide locally to said soft ice by exploding said charge by means of a separate explosive agent.

In testimony whereof I affix my signature.

HOWARD TURNER BARNES.